March 8, 1966     W. H. BINYON     3,239,170
MULTIPLE LOOP FLORAL DISPLAY DEVICE
Filed March 9, 1964
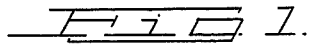
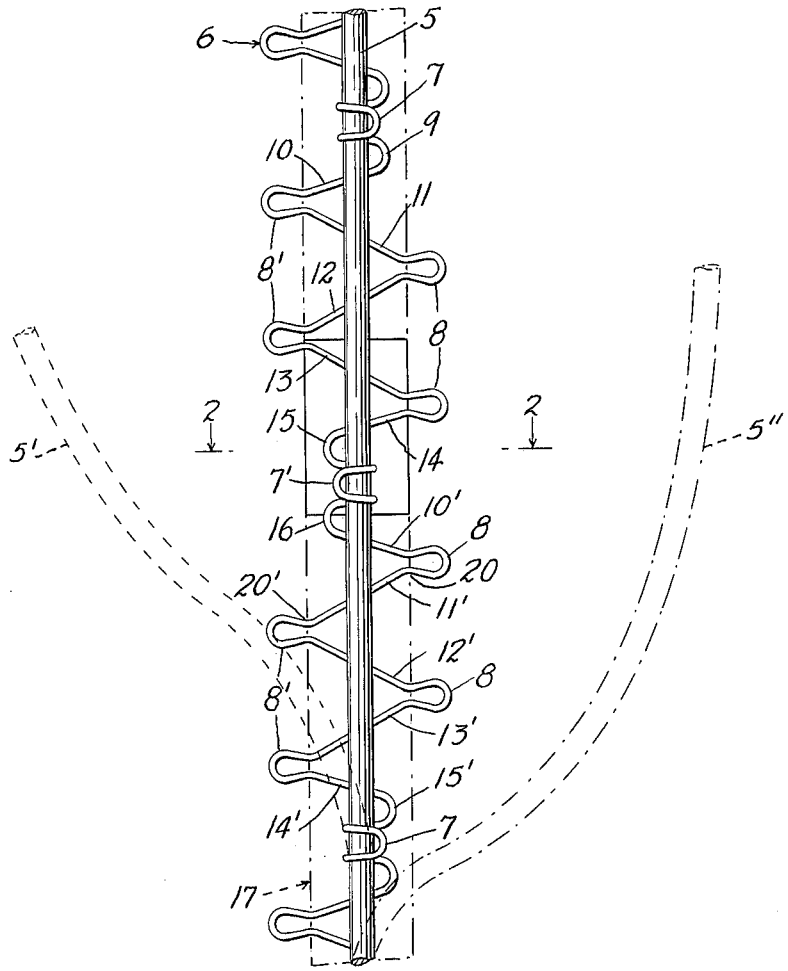
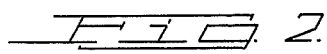
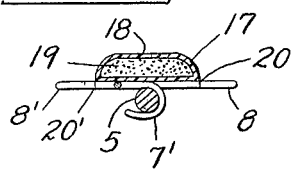
INVENTOR.
WALTER H. BINYON
BY
Howard E. Thompson
ATTORNEY

United States Patent Office 3,239,170
Patented Mar. 8, 1966

3,239,170
MULTIPLE LOOP FLORAL DISPLAY DEVICE
Walter H. Binyon, 32 Franklin St., Cedar Grove, N.J.
Filed Mar. 9, 1964, Ser. No. 350,357
10 Claims. (Cl. 248—27.8)

This invention relates to devices for use in producing floral arrangements in any type and kind of display and, particularly, with floral displays mounted in conjunction with pots or containers of any type or kind. More particularly, the invention deals with a device comprising an elongated freely bending rod, upon which is arranged and supported an elongated multiple loop frame fashioned from a rod, preferably of rust-proof material.

Still more particularly, the invention deals with a device of the character described, wherein a moss container can be arranged longitudinally of one surface of the frame for supplying moisture to flowers or the like coupled with the device.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a face view of a section of a device made according to my invention and indicating, in dot-dash lines, a moss container, as shown in sectional detail in FIG. 2; and FIG. 2 is a section, generally on the line 2—2 of FIG. 1, showing the moss container on one surface of the frame of the device.

In floral displays or arrangements, it is desirable to have a device for attachment of the floral products to be arranged or displayed to definitely retain them in a predetermined position or arrangement and, in the drawing, I have illustrated one adaptation and use of such a device.

In the drawing, 5 represents an elongated rod, preferably of rust-proof and bendable material, so that the rod may be shaped, as partially shown in dotted lines at 5' at the left of FIG. 1, or in dot-dash lines, as shown at 5" in said figure. I have found that a practical form of rod is a pliable aluminum rod, generally similar to rods of this kind used for riveting purposes. At 6 I have shown, in FIG. 1, a sectional portion of the frame of the display, the frame being fashioned from a rod, preferably of rust-proof material and, when metal rods are used, stainless steel or rods of other metals can be employed, so long as the various portions of the frame will normally substantially maintain their shape and contour, as diagrammatically illustrated in FIG. 1, even though the rod 5 is bent or flexed in manners illustrated, in part, at 5' and 5" in FIG. 1 and then returned to a longitudinally straight position. The rod of the frame 6 is fashioned at spaced intervals to form rod engaging hooks 7, 7'. The only difference between the hooks 7 and the hooks 7' is that alternate hooks 7' are extended in a direction opposed to the hooks 7. The hooks 7, 7' are fashioned to have a snap engagement with the rod 5, as will appear from a consideration of FIG. 2, but when the frame is mounted on the rod, these hooks will retain the frame against accidental displacement.

Between the spaced hooks, the frame has pairs of coupling loops 8, 8', the pairs of loops 8 extending in a direction in which the hooks 7 are open; whereas, the pairs of loops 8' extend in the opposite direction or, in other words, in the direction that the hooks 7' are open.

In the illustration in FIG. 1 of the drawing, at least one complete section of the frame 6 is illustrated, in other words, the section extending between the upper hook 7 and the lower hook 7. The wire or strand forming the frame extends from the upper hook 7 in a rounded portion 9 and joins one side of the upper loop in the pair of loops 8', as seen at 10. The other side 11 extends to the upper loop 8, 10 and 11 diverging from the upper loop 8'. The other side 12 of the upper loop 8 extends to the upper side of the second loop 8', thus 11 and 12 are in diverging relationship to each other. 13 joins the lower loop 8' with the lower loop 8; whereas, 14 joins the lower loop 8 with the rounded portion 15 of the hook 7' and at 16 is shown a rounded portion extending from the hook 7'.

To simplify the description, the portions similar to 10, 11, 12, 13 and 14 dealing with the upper two pairs of loops, as shown in FIG. 1, will be the same, but in a reverse arrangement in dealing with the lower pairs of loops, as illustrated in FIG. 1, and these reference numerals will be primed in designating similar arrangements of the rods, as at 10', 11', 12', 13' and 14', 14' extending to a rounded portion 15' adjacent the lower hook 7. This arrangement is continued throughout the full length of the rod or the frame 6 as arranged upon the rod, keeping in mind that the rod may have a free lower end for mounting in connection with any type and kind of support or for insertion into the earth of a pot or other container. No support is shown, as mountings of rods of this type and kind are well-known in the art.

Considering FIG. 2 of the drawing, it will appear that the hooks 7, 7' extend from one surface of an otherwise flat frame, the loop portions of the frame lying in a common plane. The display devices, as shown in FIG. 1 in full lines, can be used as such for attachment of floral elements of any type or kind. In this connection, the term floral is to be applied to plants, vines, as well as flowers, the loops being utilized for securing the various floral elements in predetermined position; whereas, the bending or flexure of the rod is to control positioning of the floral elements in creating the predetermined display.

In FIG. 2 of the drawing, I have diagrammatically shown, in section, a moisture supply element comprising an elongated plastic or other container 17 which can be arranged longitudinally of the frame and suitably attached thereto, the longitudinal arrangement being indicated by the dot-dash showing at 17 in FIG. 1 of the drawing. The container will have centrally of the outer surface thereof longitudinally spaced apertures, one of which is indicated at 18 in FIG. 2 and within the container is supported a suitable wettable moss 19, such as spagnum moss, so that floral elements requiring supply of moisture during the display or arrangement will have such supply and these floral elements can be extended into the moss 19 through the apertures 18, which are provided. In any event, the container 17 is so arranged upon the frame 6 that the loops 8, 8' project at sides of 17 to be available for attachment of floral elements thereto, either by passing suitable attaching means through the loops or around contracted portions, such as 20 on 8 or 20' on 8'.

The hooks 7, 7' will normally retain the frame 6 against movement longitudinally of the rod 5. However, this engagement is frictional and will permit a forcible movement of the frame longitudinally of the rod for positioning thereon.

Having fully described my invention, what I claim as new and desire to secure by Letters Patent is:

1. A display device of the character defined comprising an elongated rod, a frame mounted on and extending longitudinally of the rod, said frame comprising an endless strand fashioned to form spaced oppositely directed rod engaging hooks, the frame between adjacent hooks having pairs of laterally projecting loops joining the hook in rounded portions, each pair of loops including diverging portions integrally joining part of similar diverging portions of the other pairs of loops, and at least the diverging portion of one of the loops in each pair joining a hook in a rounded portion.

2. A device as defined in claim 1, wherein said rod is composed of readily bendable rust-proof material.

3. A device as defined in claim 1, wherein said rod is composed of readily bendable aluminum.

4. A device as defined in claim 1, wherein the strand of said frame is composed of rust-proof material.

5. A device as defined in claim 1, wherein the strand of said frame is composed of stainless steel.

6. A device as defined in claim 1, wherein all loops of the frame are arranged in common alinement, and said hooks projecting from one surface of the frame.

7. A device as defined in claim 1, wherein the frame includes a moisture supply element extending longitudinally of the frame and disposed inwardly with respect to said loops.

8. A device as defined in claim 7, wherein said element comprises a perforated casing, and a wettable moss arranged in said casing for supply of moisture to portions of the floral display.

9. In display devices of the character defined, a frame comprising an endless strand fashioned to form on a surface of the frame spaced oppositely directed hooks, the frame between adjacent hooks having laterally projecting loops arranged in a common plane, the loops at one side of the frame being spaced with respect to the loops on the opposed side of the frame, and the loops at one side of the frame having portions diverging in the direction of the opposed side of the frame.

10. A device as defined in claim 9, wherein diverging portions of the loops on both sides of the frame join said hooks in rounded portions.

References Cited by the Examiner

UNITED STATES PATENTS

| | | | |
|---|---|---|---|
| 1,557,506 | 10/1925 | Walthers | 47—41 |
| 1,794,076 | 2/1931 | Jablons | 248—167 |
| 2,011,990 | 8/1935 | Aldridge | 47—47 |
| 3,170,612 | 2/1965 | Blumenschein | 224—45 |

CLAUDE A. LE ROY, *Primary Examiner.*

K. J. WINGERT, *Assistant Examiner.*